(12) United States Patent
Carreira

(10) Patent No.: US 6,604,887 B2
(45) Date of Patent: Aug. 12, 2003

(54) ADJUSTABLE STEERING TIE ROD

(75) Inventor: Celso Gomes Carreira, Santo Andre (BR)

(73) Assignee: Dana Corporation, Toleo, OH (US)

( * ) Notice: Subject to any disclaimer, the term of this patent is extended or adjusted under 35 U.S.C. 154(b) by 74 days.

(21) Appl. No.: 09/795,697

(22) Filed: Feb. 28, 2001

(65) Prior Publication Data

US 2002/0102132 A1 Aug. 1, 2002

(30) Foreign Application Priority Data

Feb. 28, 2000 (BR) .............................................. 0000636

(51) Int. Cl.$^7$ .................................................. F16B 2/00
(52) U.S. Cl. ..................... 403/373; 403/374.3; 403/371
(58) Field of Search .............................. 403/373, 374.1, 403/374.3, 374.4, 369, 371

(56) References Cited

U.S. PATENT DOCUMENTS

| | | | | |
|---|---|---|---|---|
| 2,696,397 A | * | 12/1954 | Booth | 403/46 |
| 3,498,652 A | * | 3/1970 | Cass | 403/290 |
| 5,059,053 A | * | 10/1991 | Rose | 403/373 X |
| 5,286,133 A | * | 2/1994 | Wood | 403/290 |
| 5,306,095 A | * | 4/1994 | Snitgen et al. | 403/290 |
| 5,429,447 A | * | 7/1995 | Wood | 403/46 |
| 5,603,583 A | * | 2/1997 | Jackson | 403/320 |
| 5,810,504 A | * | 9/1998 | Rabinovich | 403/371 |
| 6,074,125 A | * | 6/2000 | Krawczak | 403/374.3 |

* cited by examiner

Primary Examiner—Lynne H. Browne
Assistant Examiner—David E. Bochna
(74) Attorney, Agent, or Firm—Rader, Fishman & Grauer PLLC

(57) ABSTRACT

An adjustable steering tie rod assembly for a motorized vehicle is disclosed. The steering tie rod assembly has at one end a threaded steering terminal connected to a tube that has a ring-like cavity and an intermediate tubular member. The intermediate member has an internal thread and a ring-like projection on the external surface. The threaded steering terminal, the intermediate member, and the tube are connected in a concentric arrangement. The internal thread and the ring-like projection of the intermediate member allow, through the rotative movement, to adjust the length of the assembly with no axial movement of the intermediate member. A clamping mechanism is provided to ensure that the three components be fastened adequately and that a solid assembly is formed for ensuring safety for the users.

11 Claims, 1 Drawing Sheet

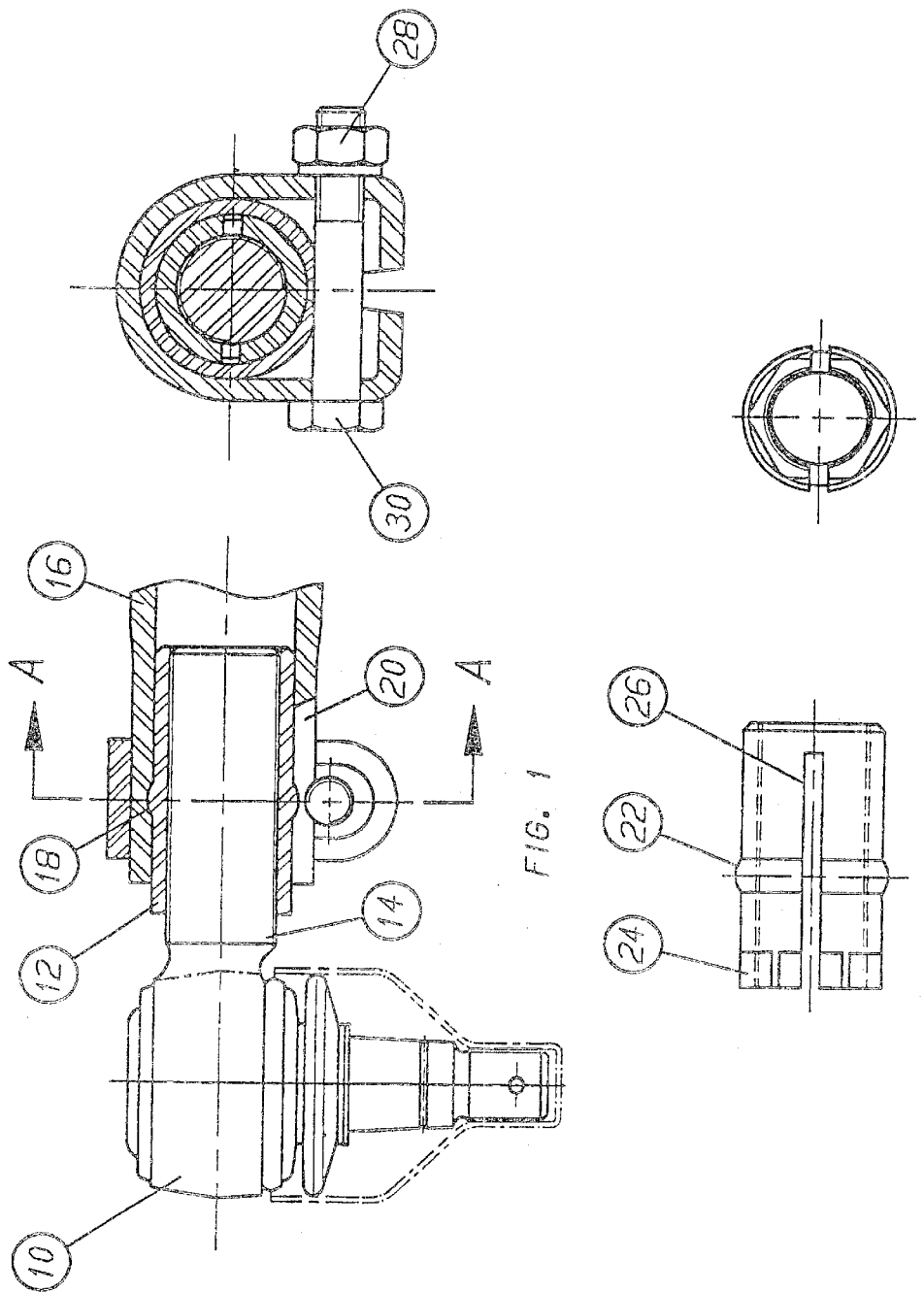

ADJUSTABLE STEERING TIE ROD

TECHNICAL FIELD

This invention is directed to adjustable steering tie rods that have improved adjustment means. It is employed in steering tie rods for motorized vehicles for adjusting the length of the steering tie rod, without the usual disassembly, such that a predetermined toe-in or toe-out angel prescribed for the front wheels of the vehicle is obtained.

BACKGROUND OF THE INVENTION

Known steering tie rods employ an adjusting rod, with a sleeve having an internal thread with blades to the left on one side and to the right on the other side, where steering terminals are mounted. Adjustment is obtained through rotation of the sleeve in an appropriate direction. A pair of clamps, bolts, and fastener nuts are employed for obtaining a perfect fastening.

However, this construction has the inconvenience of requiring multiple fastening systems (clampers, bolts, and nuts), one for each end of the sleeve, thereby requiring consequently more space, increasing the length of the tie rod assembly and making difficult to utilize this system in some cases besides the necessity of a larger space requirement and difficulty in usage of tools for adjusting and fastening the steering tie rod in the vehicle.

Another known way utilized for obtaining desired tie rod angle settings is employing an intermediate member having internal and external thread. The setting is obtained through the rotation of the intermediate member in an appropriate direction. However, this construction inconveniently requires moving the intermediate member in the axial direction to perform the coupling. Accordingly, the rotation of the intermediate member weakens the thread, thereby reducing the safety factor, which is typically ensured by rigid control of the intermediate member assembly.

SUMMARY OF THE INVENTION

The current invention eliminates all the aforementioned prior inconveniences, since it allows to set the geometry of the front wheels in any projects, and since an extremely reduced space is required, it allows setting within the small space due to the prior reason and it maintain the rigidity required for the safety of motorized vehicles' users.

BRIEF DESCRIPTION OF THE DRAWINGS

The invention will be better understood by an explanation through an example of accomplishment, described below, referring to the drawings attached, that show:

FIG. 1 is a partial cross-sectional view of a steering tie rod assembly in accordance with the present invention.

FIG. 1A is a cross-sectional view of the steering tie rod of FIG. 1, taken along line A—A in FIG. 1.

FIG. 2 is an elevational view of a setting member used in connection with the steering tie rod assembly.

FIG. 3 is a planar view of the setting member of FIG. 2.

DETAILED DESCRIPTION OF THE PREFERRED EMBODIMENT

FIG. 1 shows one end of a steering tie rod assembly for a steering system of a motorized vehicle. The assembly in FIG. 1 includes a steering terminal (10) mounted at the end of a steering tie rod, through an intermediate setting member (12). The steering terminal (10) is connected to a steering arm of a steering knuckle of the vehicle's front wheel.

According to this invention the setting member (12) provides a mechanism for setting the length of the steering tie rod. Specifically, the setting member (12) sets the toe-in or toe-out angle of the vehicle's front wheels.

The steering terminal (10) includes a threaded region (14) at its end. Typically, the threaded region (14) has right pitch. A tubular end (16) has in its internal part a cavity (18) and a slot (20) extending axially. The intermediate member (12) has a typical tubular construction, and extending in its internal profile a thread with right pitch that corresponds to the thread (14) of the steering terminal (10).

A ring-like projection (22) is formed on the external surface of the intermediate setting member (12). This ring-like projection (22) corresponds to the cavity (18) of the tubular end (16). The intermediate setting member (12) is provided with hexagonal profile (24). A portion of the intermediary setting member (12) is tighten in order to form an axially extended slot.

For better explanation, the working mode of the steering tie rod adjustable system is described as follows:

The intermediate member (12) of the steering tie rod of FIG. 1 is embodied in the tubular end (16) until the ring-like projection (22) is fitted in the cavity (18) and the steering terminal (10) is threaded in the intermediate member (12) in a concentric coupling.

When it is required to set the full length of the steering tie rod, a tool is utilized through the hexagonal part (24) (as best seen in FIGS. 2 and 3) rotating the intermediate member (12). Because there is a sliding trail between the projection (22) and the cavity (18), the intermediate member (12) remains stationary, allowing axial movement of the steering terminal (10), through the internal thread at the intermediate member (12) and the external thread of the terminal (10).

This axial movement reduces or increases the length of the steering tie rod, depending on the direction in which the intermediate member (12) is rotated. After processing the adjustment, the clamp's nut (28) is fastened causing solid fastening through compensation of clearances induced by reducing the width of the slots (20) and (26). When the clamp's nut (28) is being tightened, an accidental rotation of the intermediate member (12) will be prevented.

In short, the adjustment of a steering tie rod according to this invention is characterized by its simplicity of construction and by the access to the fastening bolt (30) and fastening nut (28), which is facilitated by their relative position and by the extremely compact construction.

What is claimed is:

1. An adjustable steering tie rod assembly, comprising:
   a steering terminal having an externally threaded region;
   a tubular end having art interior cavity; and
   an intermediate member positioned between the steering terminal and the tubular end thereby preventing contact between the steering terminal and the tubular end;
   the intermediate member further includes an internal threaded part having a plurality of threads, wherein the plurality of threads are coupled to the externally threaded region of the steering terminal; and
   wherein the intermediate member includes a projection on an external face coupled to the interior cavity of the tubular end to substantially prevent axial movement of the intermediate member.

2. The adjustable steering tie rod assembly of claim 1, wherein the intermediate member has a hexagonal profile at its end.

3. The adjustable steering tie rod assembly of claim 1, wherein the intermediate member is rotatable with respect to the steering terminal and the tubular end, to permit selective adjustment of the tie rod length.

4. The adjustable steering tie rod assembly of claim 1, wherein the intermediate member remains fixed with respect to the tubular end during adjustment of the tie rod length.

5. The adjustable steering tie rod assembly of claim 1, wherein the tubular end further includes at least one axially extending slot.

6. The adjustable steering tie rod assembly of claim 5, wherein the slot of the tubular end is selectively compressible in a cicumferential direction when submitted to a predetermined clamping force.

7. The adjustable steering tie rod assembly of claim 6, further including clamp mechanism to selectively compress the slot of the tubular end.

8. The adjustable steering tie rod assembly of claim 1, wherein the intermediate member is further provided with at least one axially extending slot.

9. The adjustable steering tie rod assembly of claim 8, wherein the slot of the intermediate member is selectively compressible in a circumferential direction when submitted to a predetermined clamping force.

10. The adjustable steering tie rod assembly of claim 1, wherein the projection excludes threads.

11. An adjustable steering tie rod assembly, comprising:

a steering terminal having an externally threaded region;

a tubular end having an interior cavity;

an intermediate member positioned between the steering terminal and the tubular end thereby preventing contact between the steering terminal and the tubular end and having an internal threaded part with a plurality of threads; and a clamp assembly;

wherein the plurality of threads of the internal threaded part of the intermediate member are coupled to the externally threaded region of the steering terminal; and wherein the intermediate member further includes a projection on an external face coupled to the interior cavity of the tubular end to substantially prevent axial movement of the intermediate member, and the clamp assembly is selectively tightened once a predetermined length for the tie rod assembly is selected.

* * * * *